(12) United States Patent
Gray et al.

(10) Patent No.: US 8,950,275 B2
(45) Date of Patent: Feb. 10, 2015

(54) SYSTEM AND METHOD FOR TRACKED VEHICLE DYNAMOMETER TESTING

(71) Applicants: Jeremy P. Gray, Clarkston, MI (US); Tyrus J. Valascho, Clarkston, MI (US); Michael S. Patterson, Macomb, MI (US)

(72) Inventors: Jeremy P. Gray, Clarkston, MI (US); Tyrus J. Valascho, Clarkston, MI (US); Michael S. Patterson, Macomb, MI (US)

(73) Assignee: The United Stated of America as represented by the Secretary of the Army, Washington, DC (US)

( * ) Notice: Subject to any disclaimer, the term of this patent is extended or adjusted under 35 U.S.C. 154(b) by 54 days.

(21) Appl. No.: 13/935,099

(22) Filed: Jul. 3, 2013

(65) Prior Publication Data

US 2015/0007643 A1   Jan. 8, 2015

(51) Int. Cl.
*G01L 5/00* (2006.01)
*G01L 1/22* (2006.01)
*G01M 17/007* (2006.01)

(52) U.S. Cl.
CPC .................................. *G01M 17/0072* (2013.01)
USPC ......................................... 73/862.01; 73/862

(58) Field of Classification Search
USPC .............................................. 73/862.01, 862
See application file for complete search history.

(56) References Cited

U.S. PATENT DOCUMENTS

| | | | |
|---|---|---|---|
| 3,345,865 A | 10/1967 | Ostrander | |
| 3,848,785 A | 11/1974 | Bott | |
| 3,947,764 A | 3/1976 | Abbott et al. | |
| 4,319,298 A | 3/1982 | Davis et al. | |
| 4,326,655 A | 4/1982 | Gradek et al. | |
| 4,455,866 A | 6/1984 | Barrigar | |
| 4,798,088 A | 1/1989 | Haeg et al. | |
| 5,111,685 A | 5/1992 | Langer | |
| 5,574,226 A | 11/1996 | Reuther et al. | |
| 6,360,591 B1* | 3/2002 | Carley | 73/116.06 |
| 6,446,501 B1* | 9/2002 | Domeck et al. | 73/146 |
| 7,213,449 B2* | 5/2007 | Barnes et al. | 73/116.11 |
| 7,841,233 B2* | 11/2010 | Cogotti | 73/147 |
| 2010/0010668 A1* | 1/2010 | Udono | 700/245 |
| 2010/0251832 A1* | 10/2010 | Kirkpatrick | 73/862.191 |

* cited by examiner

*Primary Examiner* — Lisa Caputo
*Assistant Examiner* — Jamel Williams
(74) *Attorney, Agent, or Firm* — David L. Kuhn; Thomas W. Saur; Luis Miguel Acosta

(57) ABSTRACT

A system and method for tracked vehicle dynamometer testing. The dynamometer system may be configured as a treadmill electric chassis dynamometer having dual, parallel endless belts positioned as substantially flat surfaces with cleats, i.e., the tracks of a test vehicle and a dynamometer vehicle. The track assemblies of the test vehicle and the dynamometer vehicle are generally vertically, mechanically coupled in close contact with each other via a retention fixture. The testing may be conducted in a climatic chamber to simulate various environmental conditions.

20 Claims, 5 Drawing Sheets

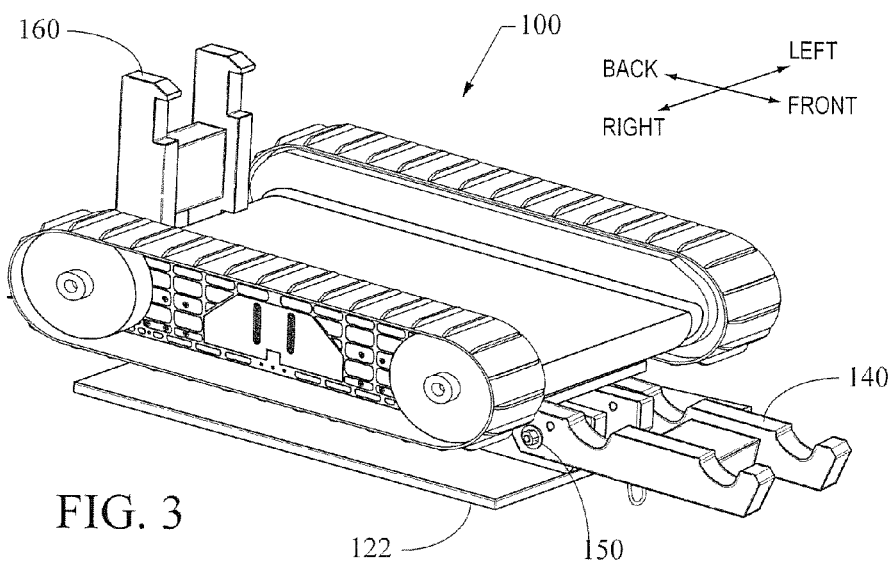
FIG. 3
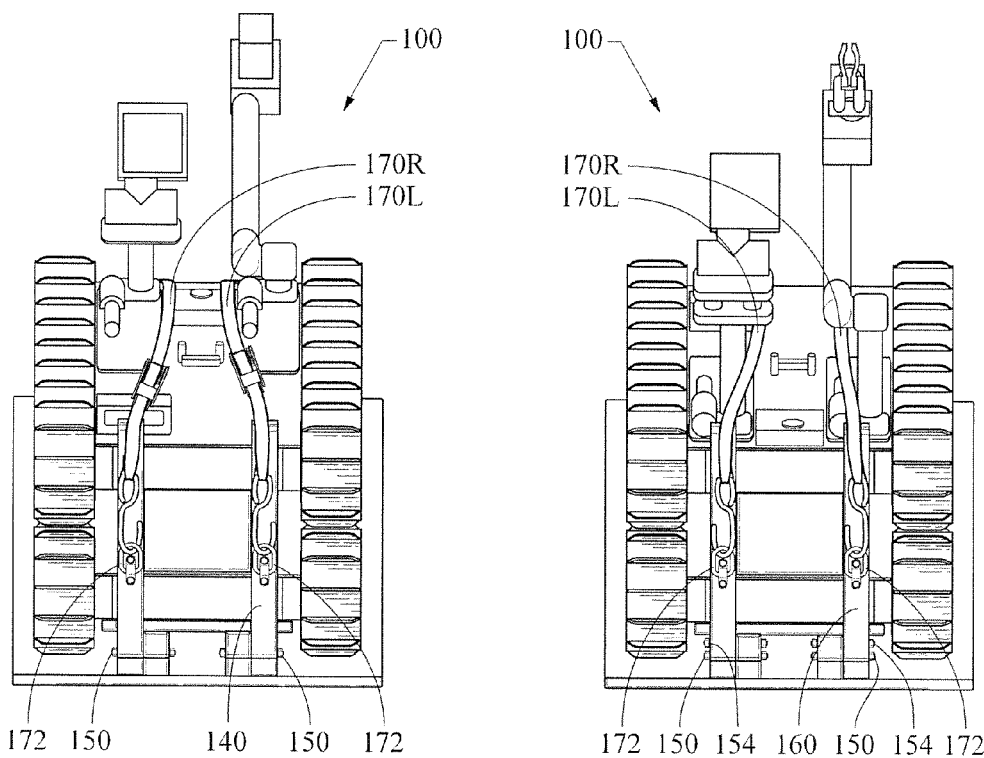
FIG. 4
FIG. 5

SYSTEM AND METHOD FOR TRACKED VEHICLE DYNAMOMETER TESTING

GOVERNMENT INTEREST

The invention described here may be made, used and licensed by and for the U.S. Government for governmental purposes without paying royalty to us.

CROSS-REFERENCE TO RELATED APPLICATIONS

Not applicable.

BACKGROUND OF THE INVENTION

1. Field of the Invention

The present invention generally relates to a system and method for tracked vehicle dynamometer testing.

2. Background Art

Conventional approaches to dynamometer test systems, and other related technologies may not provide the capabilities for specialized vehicle (e.g., small, tracked, unmanned ground vehicles) testing that is sometimes desired. Thus, there exists a need and an opportunity for an improved system and method for tracked vehicle dynamometer testing. Such an improved system and method may overcome one or more of the deficiencies of the conventional approaches.

SUMMARY OF THE INVENTION

Accordingly, the present invention may provide a system and method for tracked vehicle (e.g., a small tracked robot, unmanned ground vehicle (UGV)) electrical dynamometer testing including a retention fixture, sensors and sensor output analysis equipment, and variable electrical resistance configured as an electrical load to the electrical dynamometer. The system may be essentially portable such that a portion of the testing can be performed in a climatic test chamber to simulate various types of operation in various climate conditions as may be encountered by the vehicle during expected modes of operation and/or desired by a user.

In a preferred embodiment, the dynamometer system may incorporate a non-accessorized (e.g., basic shell) small, dual-tracked dynamometer (dyno) robot as the electrical generator energy absorbing adjustable load where the dyno robot is similar to the tested small, dual-tracked robot. The test system (e.g., apparatus, device, etc.) generally includes a retention fixture that secures the bottom of the track assembly of the test small, tracked robot (i.e., the test vehicle) to the top of the track assembly of the fully functional, similar, small, tracked dyno robot vehicle (i.e., the dynamometer vehicle).

The retention fixture generally provides inter-coupling of the robot tracks between the test vehicle and the dynamometer vehicle. The dynamometer system may be configured as a treadmill chassis dynamometer having dual, parallel endless belts positioned as substantially flat surfaces with cleats (i.e., the tracks of the test vehicle and the dyno vehicle). The track assemblies of the two robot vehicles are generally held in close contact with each other.

The dynamometer energy absorbing subsystem may be implemented via operating the track motors in the bottom (i.e., dyno) robot vehicle assembly as generators that are coupled to the variable load resistors. As such, the test dynamometer (i.e., bottom) small, tracked robot track assembly may be adjusted via the variable load resistors to provide simulated terrains with the capability to mimic (i.e., imitate, replicate, and the like) a variety of elevation grade changes and terrain conditions as may be encountered by the test vehicle (i.e., the test vehicle small, tracked robot) as determined by testing and measuring a number of parameters from a baseline robot vehicle in a variety of actual operational (e.g., real world) conditions.

The dynamometer system generally provides an apparatus for environmental testing of specialized unmanned ground vehicles (e.g., small, tracked robots; UGVs, and the like). The dynamometer system and method may provide the capability of laboratory testing of small, tracked UGVs that simulates real world field data. The dynamometer system and method may provide reliable and repeatable testing and prove-out of the UGVs for a variety of operating environments in the laboratory environmental chambers.

The dynamometer portion of the system generally implements unmanned robot tracks and underbody chassis assembly as an endless belt, moving ground test surface that is portable and may used in the laboratory environment and in the climatologically variable environmental chambers.

The process implemented via the present invention implements operating a baseline unmanned robot to obtain (record) the environmental temperature, inclination, and ground surface information through testing in the desired terrain and conditions. The recorded information (data) is implemented in connection with test unmanned ground vehicles to simulate the field conditions that were tested for dynamometer testing in a laboratory environment and in the environmental chambers. Such a process helps ensure repeatability in life cycle testing and prove-out of the unmanned ground vehicle test robots. The dynamometer apparatus, in particular the retention fixture, are configured to ensure coupling of the robot tracks for the entire test sequence in the laboratory and in the environmental chambers.

Variable (adjustable) resistance load resistors are electrically coupled to the track motors in the underbody chassis assembly section of the dynamometer apparatus vehicle. The resistors are varied (adjusted) during the test cycle sequences to duplicate the field conditions in the laboratory and in the environmental chamber tests. Thus, more tests can generally be conducted in less time for less cost. Such a process also generally provides more reliability and repeatability in the testing and prove-out of the test vehicles. Such a system and method for tracked vehicle dynamometer testing may provide the opportunity to continuously improve the design, development, and reliability of the test vehicles.

The above features, and other features and advantages of the present invention are readily apparent from the following detailed descriptions thereof when taken in connection with the accompanying drawings.

BRIEF DESCRIPTION OF THE DRAWINGS

FIG. 3 is an isometric view from the upper, front, right of the dynamometer test system of FIG. 1 with the dynamometer vehicle in place, and with the rear retention bracket raised into position to secure the dynamometer vehicle and the test vehicle, and with the front retention bracket lowered;

FIG. 4 is front, upper view of the dynamometer test system of FIG. 1 with the dynamometer vehicle and the test vehicle mounted in test position;

FIG. 5 is rear, upper view of the dynamometer test system of FIG. 1 with the dynamometer vehicle and the test vehicle mounted in test position;

DETAILED DESCRIPTION OF THE PREFERRED EMBODIMENT(S)

Definitions and Terminology

Figure 1:
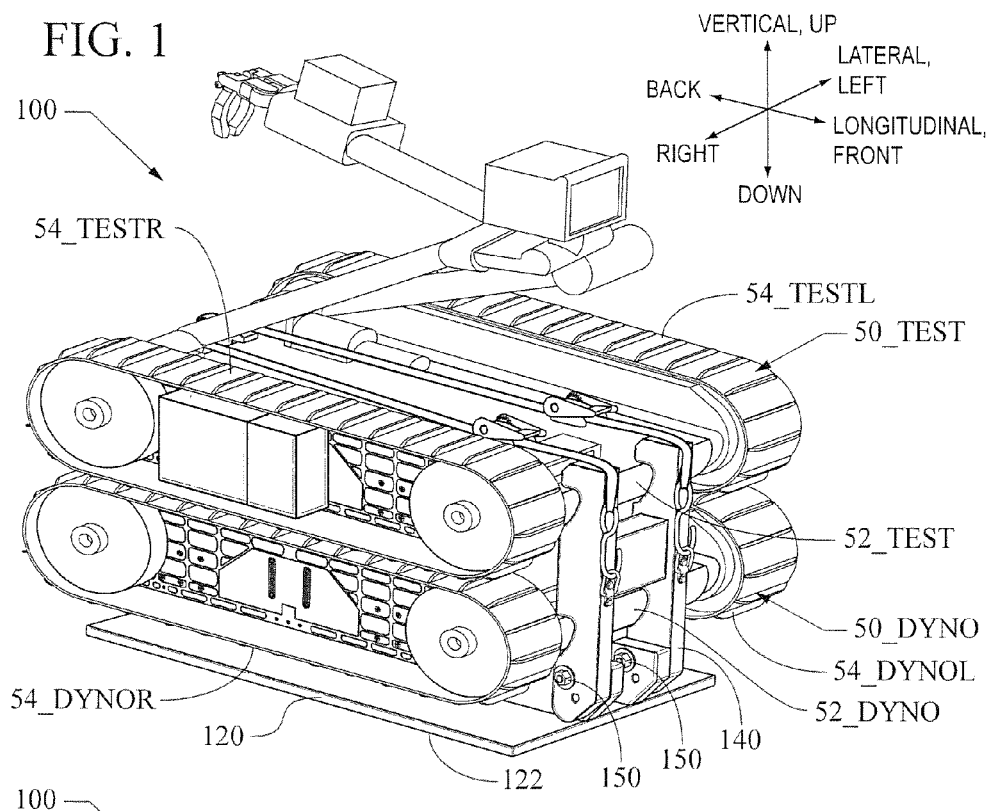
FIG. 1 is an isometric view from the upper, front, right of a tracked vehicle dynamometer test system of the present invention with a dynamometer vehicle and a test vehicle mounted in laboratory test position.

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

Like numbered elements generally refer to the same element; however, the like numbered elements may include a suffix "L" to designate the left side element and a suffix "R" to designate the right side element when left and right elements are mirrors of each other. Likewise, the like numbered elements may include a suffix "U" to designate the upper (top) element and a suffix "B" to designate the bottom element when upper and bottom elements are implemented similarly. Thus, an element designated with a compound suffix "LB" is the left, bottom implementation of the element, and so forth.

The description as follows is directed to a tracked vehicle treadmill chassis dynamometer, and includes directional designations such as up, down, left (L), right (R), lateral, transverse, longitudinal, front, forward, back/backward/rearward, top, bottom, vertical, and the like, that are generally taken from the perspective of a small, tracked unmanned ground vehicle (e.g., robot) operated by a user (e.g., operator, technician, laboratory personnel, and the like). See also, directional reference indication as shown on FIGS. 1-3 and 7-9.

As is understood by one of skill in the art, an absorbing dynamometer acts as a load that is driven by a prime mover, such as an engine, another electric motor, a human or other animal, wind or water turbine, or another power source that is under test. An electric motor dynamometer (sometimes referred to as a motor/generator) is a dynamometer that can generally measure the power, torque, and rotational speed of the prime mover. The electric motor dynamometer can be configured as a generator to absorb power under test measurement. The electric motor dynamometer operating as a generator can replace the "load side" during tests and provide a variety of torque values on the prime mover by adjustment of a variable resistance that is electrically coupled to the output of the generator. A chassis dynamometer is a dynamometer that can measure torque and power delivered by the power train of a vehicle directly from the drive wheel or wheels (without removing the engine from the frame of the vehicle). A treadmill chassis dynamometer includes an endless belt (or belts) that provide a surface to mount the test vehicle and the endless belt is coupled to the generator such that the load is presented to the prime mover.

As is further understood by one of skill in the art, to test the prime mover, a dynamometer controller, which is usually an electronic unit that has the capability of controlling the load on the dynamometer, and can measure or sense the load and speed, is generally implemented. Dynamometer controllers generally operate in one of two modes: speed controlled operation or load controlled operation. For load controlled operation, variable (adjustable) load resistors (e.g., rheostats) that can tolerate high amperages (i.e., high current), and that can also be configured (adjusted through movement of the adjustable slip rings) to different resistive values during the test sequence to accurately simulate the field data during the temperature and environmental life cycle testing in a laboratory are generally implemented.

With reference to the Figures, the preferred embodiments of the present invention will now be described in detail. Generally, the present invention provides an improved system and an improved method for tracked vehicle dynamometer testing.

Referring to FIG. 1, an isometric view from the upper, front, right of a tracked vehicle chassis dynamometer test system 100 of the present invention with a dynamometer vehicle 50_DYNO (e.g., a first vehicle 50) and a test vehicle 50_TEST (e.g., a second vehicle 50) mounted in laboratory testing positions is shown. The test system 100 generally comprises a test fixture 120 and the dynamometer vehicle 50_DYNO and the test vehicle 50_TEST, as well as a vehicle 50 that is implemented to determine baseline values (e.g., parameters, characteristics, and the like) (e.g., a baseline vehicle 50_BL (e.g., a third vehicle 50), which is not shown).

Also included in the system 100 are sensors for measuring various parameters (e.g., characteristics, data, and the like), data acquisition and/or recording equipment, input/output connections and electrical coupling interfacing, data analysis equipment including computers and appropriate computer software, variable resistance load (e.g., high current capacity) resistors, and the like as are known and understood by one of skill in the art. As such, for clarity of illustration and description, the immediately above noted elements are generally not shown herein.

The test system 100 is generally implemented as an electromagnetic absorption dynamometer configured as a treadmill chassis dynamometer system. Data that is measured on the baseline (third) vehicle 50_BL during field testing includes vehicle motor current, voltage, and temperature. Data related to the test environment (e.g., ground conditions, inclinations, atmospheric conditions, etc.) are also generally acquired for use in climatic chamber testing using the dynamometer test system 100.

The vehicles 50 (i.e., the dynamometer vehicle 50_DYNO, the test vehicle 50_TEST, and the baseline vehicle 50_BL) are generally implemented as similar (i.e., the same manufacturer, model, series, variant, etc.) conventional vehicles with differences and modifications as discussed in detail below. The baseline vehicle 50_BL and the dynamometer (second) vehicle 50_DYNO are generally chosen (selected) to be as nearly identical as is practicable with regards to the parameters of interest to the user such that the laboratory test results on the test (first) vehicle 50_TEST match expectations of field performance as was determined from field tests (i.e., real world test conditions and environment) performed on the baseline vehicle 50_BL. That is, the loads provided by the test dynamometer system 100 via the robot 50_DYNO to the test robot vehicle 50_TEST replicate (simulate, duplicate, etc.) the loads presented in the field (i.e., real world data) as measured on the baseline robot vehicle 50_BL.

In one embodiment (e.g., the embodiment shown on FIGS. 1-5 and described in connection therewith), the vehicle 50 is implemented as a small, dual-tracked, unmanned ground robot vehicle having direct current, battery powered electric motors internal to the vehicle body as the prime mover. The vehicle 50 may be implemented as a remote controlled vehicle, that is, a robot vehicle that is operated via wireless radio signals from a user operated remote control unit that is separate from the robot vehicle, as understood by one of skill in the art. As such, for clarity of illustration and description the remote control element details related to the control of the vehicle 50 are not included herein.

The test vehicle 50_TEST comprises a vehicle body 52 (e.g., vehicle body 52_TEST of the vehicle 50_TEST, and vehicle body 52_DYNO of the vehicle 50_DYNO), and left and right (first and second) tracks 54 (e.g., left and right tracks 54_TESTL and 54_TESTR of the vehicle 50_TEST, and left and right (first and second) tracks 54_DYNOL and 54_DYNOR of the vehicle 50_DYNO).

The test fixture (apparatus, device, rig, etc.) 120 (described in greater detail below in connection with FIGS. 6-10), comprises a base 122 and a front retention bracket 140. The test fixture 120 generally vertically, mechanically couples the (upper, top) vehicle 50_TEST and the (bottom, lower) vehicle 50_DYNO together via direct, adjacent contact of the left and right tracks 54_TESTL and 54_TESTR of the vehicle 50_TEST to the respective left and right (first and second) tracks 54_DYNOL and 54_DYNOR of the vehicle 50_DYNO. The test fixture 120 generally elevates the vehicle 50_DYNO above the base 122 such that the left and right (first and second) tracks 54_DYNOL and 54_DYNOR of the vehicle 50_DYNO move freely.

Figure 2:
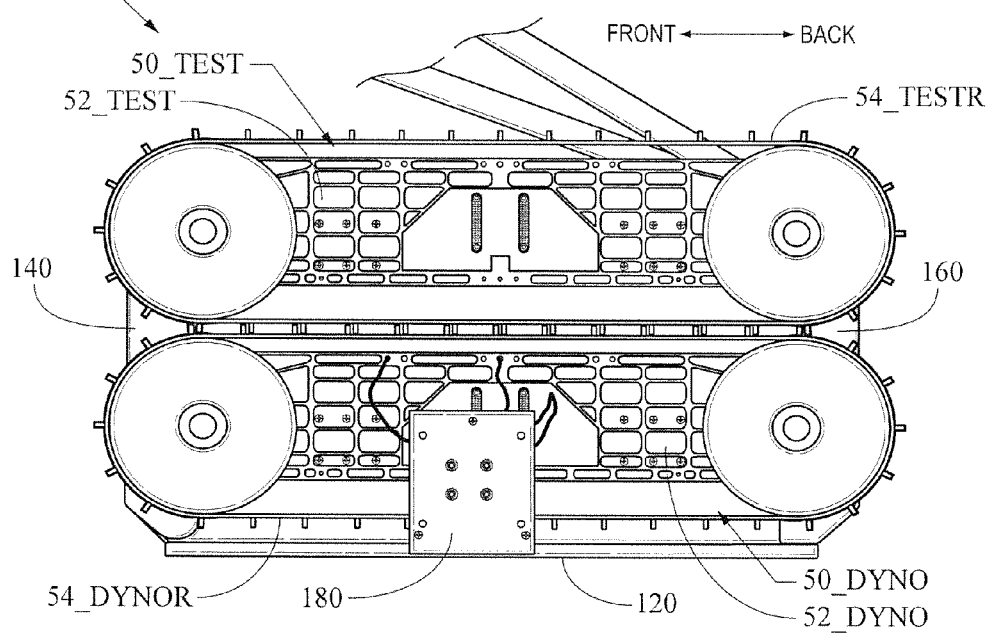
FIG. 2 is left side elevation view of the dynamometer test system of FIG. 1.

Referring to FIG. 2, a left side elevation view of the dynamometer test system 100 is shown. The dynamometer test system 100 may include a jack panel (interface block, input/output connector board, etc.) 180 that is electrically coupled to the vehicle body 52_DYNO and generally provides electrical load, sensor signal, and the like interfacing between the sensors and the motors that are implemented in the dynamometer (second) vehicle 50_DYNO and the acquisition and electrical load (e.g., variable resistance) equipment (not shown).

Referring to FIG. 3, an isometric view from the upper, front, right of the dynamometer test system 100 is shown. The dynamometer vehicle 50_DYNO is illustrated in place on the test rig 120 for testing. The front retention bracket 140 is shown as lowered to provide access for mounting the test vehicle 50_TEST into test position on to the dynamometer vehicle 50_DYNO. The test fixture 120 further comprises a rear retention bracket 160. The rear retention bracket 160 is illustrated raised into position (e.g., to the vertical) to secure the dynamometer vehicle 50_DYNO and the test vehicle 50_TEST as is illustrated, for example, on FIGS. 1 and 2.

Referring to FIGS. 4 and 5, a front, upper view and a rear, upper view, respectively, of the dynamometer test system 100 with the dynamometer vehicle 50_DYNO and the test vehicle 50_TEST mounted in test position. The retention fixture 120 further comprises four axle bolts 150, and four lock (e.g., clamp, latch, anti-rotation, etc.) bolts 154 (not illustrated on FIGS. 1 and 4), left and right (first and second) lashing, retention straps (e.g., belts, etc.) 170 (e.g., left retention strap 170L and right retention strap 170R). Each belt 170 includes a keeper/latch/buckle/tensioner that generally engages a hook, receptacle, d-ring, complementary interface member, or the like 172 on the respective left and right sides of the front retention bracket 140 and the rear retention bracket 160 over the test vehicle body 52_TEST to securely couple together the dynamometer vehicle 50_DYNO and the test vehicle 50_TEST mounted in test position.

While the retention elements 170 are illustrated as straps, other flexible retention devices, e.g., chains, cables, and the like may alternatively be implemented. Likewise, in lieu of the lock bolts 154, any alternative appropriate latching mechanism may be implemented for latching the front retention bracket 140 and the rear retention bracket 160 at the upright (substantially vertical) position.

Figure 6:
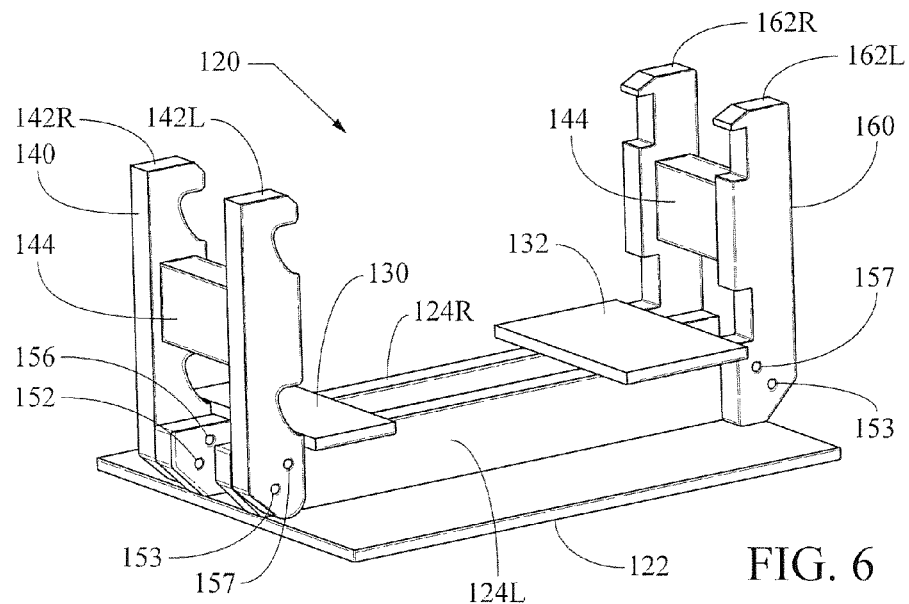
FIG. 6 is an isometric view from the upper, front, left of a test fixture of the dynamometer test system of FIG. 1 with the front retention bracket and the rear retention bracket raised into position to secure the dynamometer vehicle and the test vehicle.
Figure 7:
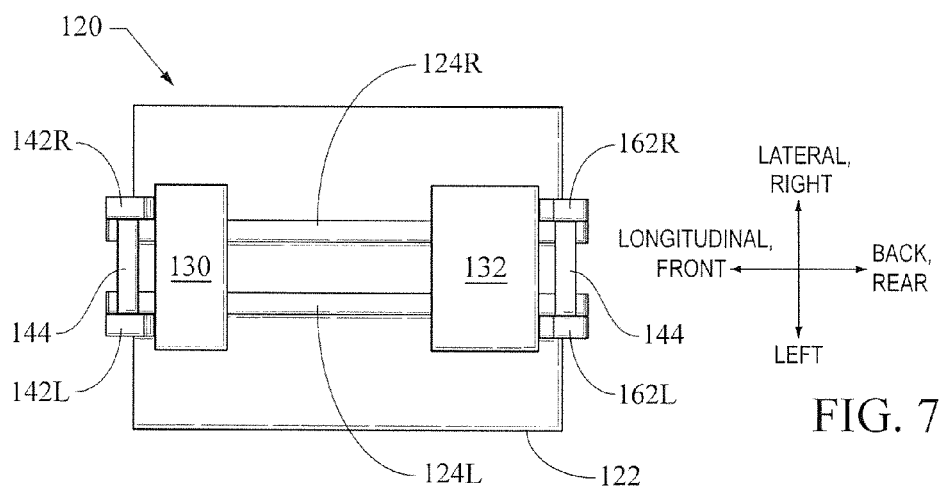
FIG. 7 is a top (plan) elevation view of the test fixture of FIG. 6.
Figure 8:
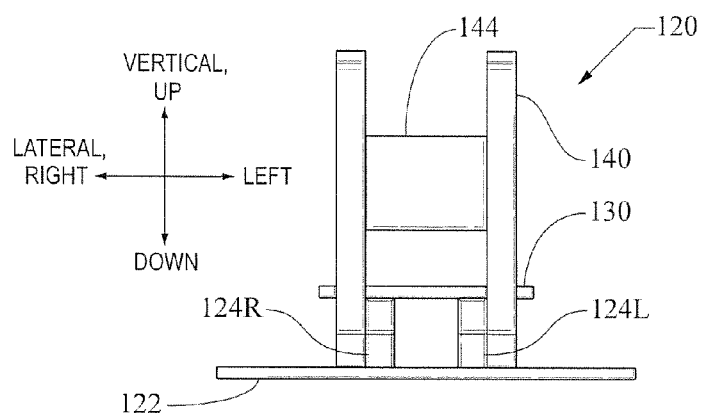
FIG. 8 is a front view of the test fixture of FIG. 6.
Figure 9:
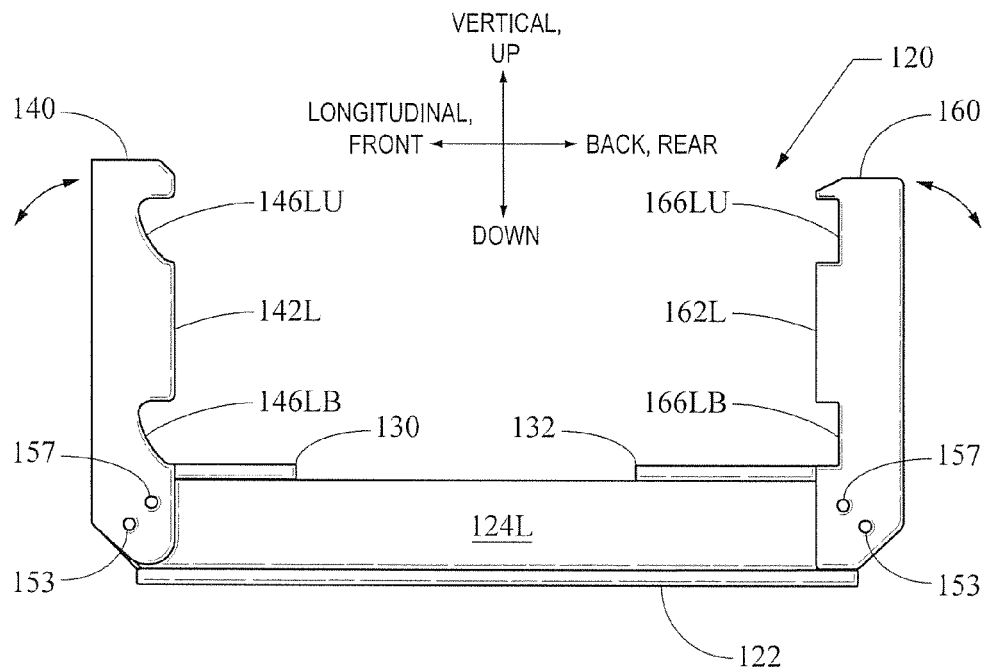
FIG. 9 is a left side elevation view of the test fixture of FIG. 6.
Figure 10:
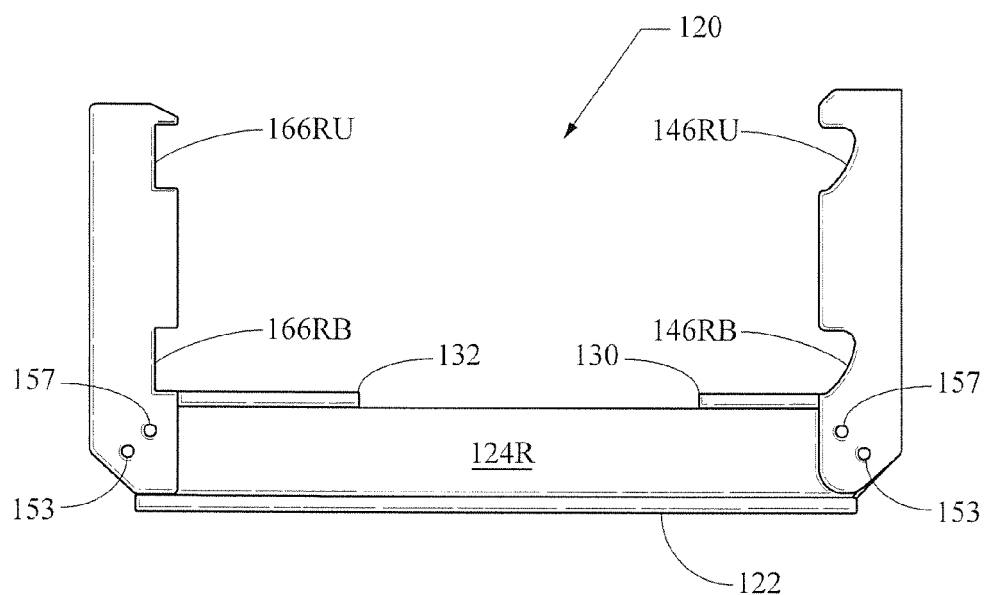
FIG. 10 is a right side elevation view of the test fixture of FIG. 6.

Referring to FIGS. 6-10, on FIG. 6, an isometric view from the upper, front, left of the test fixture 120 of the dynamometer test system 100 is shown. FIG. 7 is a top (plan) elevation view of the test retention fixture 120; FIG. 8 is a front view of the test fixture 120; FIG. 9 is a left side elevation view of the test fixture 120; and FIG. 10 is a right side elevation view of the test fixture 120.

For clarity of illustration, the left and right (first and second) retention straps 170 (i.e., the left retention strap 170L and the right retention strap 170R) along with the complementary interface members 172, the axle bolts 150, and the lock bolts 154 are not shown on FIGS. 6-10. The retention fixture 120 comprises the base 122, the front retention bracket 140, the rear retention bracket 160, left and right (first and second) platform support beams (e.g., rails, risers, studs, etc.)

124 (e.g., left support beam 124L and right support beam 124R), a front support plate (platen, shelf, plane, tray, etc.) 130, and a rear support plate (platen, shelf, plane, tray, etc.) 132.

The platform support beams 124 are positioned longitudinally and substantially parallel and fastened (fixed, mounted, etc.) on the top surface of the base 122. The front support plate 130 and the rear support plate 132 are fastened on the on the top surface of and across the platform support beams 124. The front support plate 130 and the rear support plate 132 are sized and shaped such that the dynamometer vehicle body 52_DYNO is supported substantially parallel to the base 122, such that the dynamometer vehicle 50_DYNO is provided lateral support and stability, and such that the tracks 54_DYNO of the vehicle 50_DYNO are positioned clear of (i.e., above) the base 122.

The platform support beams 124 each include a lateral axle hole 152 at the front end and at the rear end, and each of the axle holes 152 are configured to receive one of the bolts 150. The platform support beams 124 each further include a lateral support beam lock hole 156 at the front end and at the rear end, and each of the beam lock holes 156 are configured to receive one of the lock bolts 154.

The front retention bracket 140 further comprises left and right (first and second) front arms 142 (e.g., left front arm 142L and right front arm 142R), and a front (first) cross bar 144. The front arms 142 each include a lateral axle bolt hole 153 at the first end that receives one of the axle bolts 150; a lateral arm lock hole 157 that is configured to align with a respective support beam lock hole 156 and receive one of the lock bolts 154 when the front retention bracket 140 is substantially vertical; and lateral front retention notches 146 (e.g., left, upper front retention notch 146LU and left, bottom front retention notch 146LB in the left front arm 142L; and right, upper front retention notch 146RU and right, bottom front retention notch 146RB in the right front arm 142R). The first cross bar 144 extends laterally between the left front arm 142L and the right front arm 142R such that the left front arm 142L and the right front arm 142R straddle the front ends of the platform support beams 124.

The axle bolts 150 that are installed laterally through the holes 152 and 153 to couple the front retention bracket 140 to the platform support beams 124 form a revolute joint such that the front retention bracket 140 is rotatable between substantially vertical and substantially horizontal positions. The front edge of the front support plate 130 and the rear edge of the front retention bracket 140 may be substantially adjacent when the front retention bracket 140 is rotated to the substantially vertical position. The second (free) ends of the front arms 142 are tapered and angled (i.e., sized and shaped) such that interference with known or anticipated (predetermined) accessories (e.g., system payloads such as manipulator or camera arms, cameras, sensors, etc.) that are typically mounted to the test vehicle 50_TEST is avoided.

The left, bottom front retention notch 146LB and the right, bottom front retention notch 146RB are positioned, sized and shaped to accept (e.g., interface with) the front edge of the dynamometer vehicle body 52_DYNO. The left, upper front retention notch 146LU and the right, upper front retention notch 146RU are positioned, sized and shaped to accept (e.g., interface with) the front edge of the test vehicle body 52_TEST.

The rear retention bracket 160 further comprises left and right (first and second) rear arms 162 (e.g., left front arm 162L and right front arm 162R), and a rear (second) cross bar 144. The rear arms 162 each include a lateral bolt hole at the first end that receives one of the bolts 150; a lateral arm lock hole 157 that is configured to align with a respective support beam lock hole 156 and receive one of the lock bolts 154 when the rear retention bracket 160 is substantially vertical; and lateral front retention notches 166 (e.g., left, upper rear retention notch 166LU and left, bottom rear retention notch 166LB in the left rear arm 162L; and right, upper rear retention notch 166RU and right, bottom rear retention notch 166RB in the right rear arm 162R). The second cross bar 144 extends laterally between the left rear arm 162L and the right rear arm 162R such that the left rear arm 162L and the right rear arm 162R straddle the rear ends of the platform support beams 124.

The axle bolts 150 that are installed laterally through the holes 152 and 153 to couple the rear retention bracket 160 to the platform support beams 124 form a revolute joint such that the rear retention bracket 160 is pivotable (rotatable) between substantially vertical and substantially horizontal positions. The rear edge of the rear support plate 132 and the front edge of the rear retention bracket 160 may be substantially adjacent when the rear retention bracket 160 is rotated to the substantially vertical position. The second (free) ends of the rear arms 162 are tapered and angled (i.e., sized and shaped) such that interference with known or anticipated (predetermined) accessories (e.g., system payloads such as manipulator or camera arms, cameras, sensors, etc.) that are typically mounted to the test vehicle 50_TEST is avoided.

The left, bottom rear retention notch 166LB and the right, bottom rear retention notch 166RB are positioned, sized and shaped to accept (e.g., interface with) the rear edge of the dynamometer vehicle body 52_DYNO. The left, upper rear retention notch 166LU and the right, upper rear retention notch 166RU are positioned, sized and shaped to accept (e.g., interface with) the rear edge of the test vehicle body 52_TEST.

Referring back to FIGS. 1-5, with the front retention bracket 140 and the rear retention bracket 160 pivoted (rotated) into the substantially vertical position and locked into position via installation of the lock bolts 154 through the matingly aligned holes 156 and 157, and the straps 170 lashed between the front retention bracket 140 and the rear retention bracket 160 via the retention members 172, the retention fixture 120 may grasp (e.g., hold, retain, secure, mount, etc.) the dynamometer vehicle 50_DYNO and the test vehicle 50_TEST in position for portable chassis dynamometer testing in a laboratory and/or climatic test chamber. As such, the fixture 120 generally provides a stable, secure structure for implementation of dynamometer testing the test vehicle 50_TEST via the dynamometer vehicle 50_DYNO.

Appropriate electrical apparatus and configuration for tracked robot system testing (not shown) includes variable load resistors that are electrically coupled to each of the motors of the dynamometer robot tracks 54_DYNO. The variable resistors are generally adjusted to provide the simulated terrain, complete with the capability to mimic all elevation grade changes and terrain conditions (i.e., load conditions) desired by the user. Alternatively, voltage may be applied (provided) to the motors of the dynamometer vehicle 5-_DYNO to simulate a "downhill" (e.g., "free spinning", braking/stopping, and the like) operating condition (e.g., an assist), wherein the test vehicle 50_TEST experiences drag or braking in response to the applied voltage. As would be understood and appreciated by one of skill in the art, dynamic control of the dynamometer vehicle 50_DYNO may be implemented to provide a variety of programmed test cycles as desired to meet the design criteria of a particular application.

Figure 11:
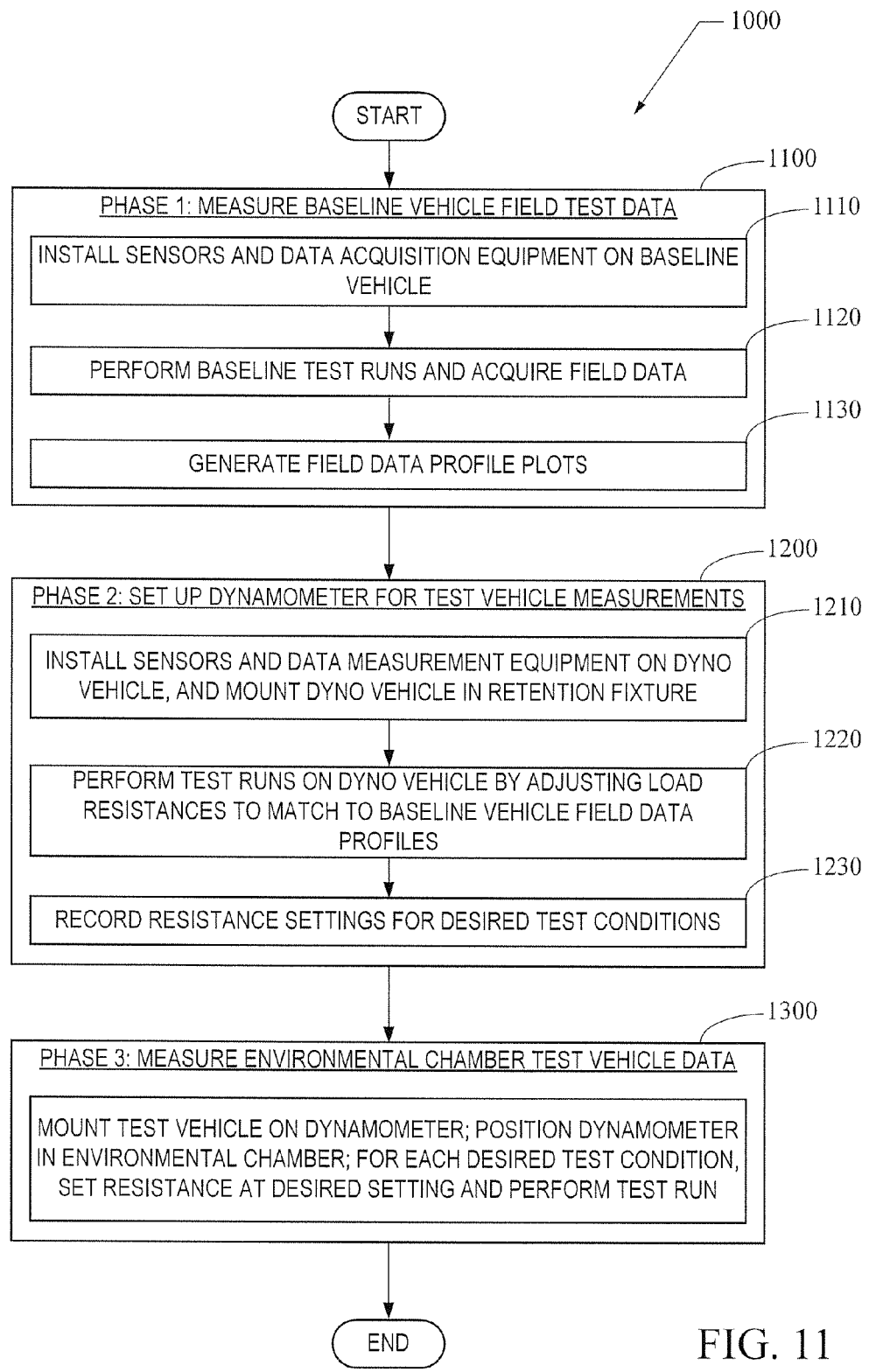
FIG. 11 is a flow diagram of a test method the implements the dynamometer test system of FIG. 1.

Referring to FIG. 11, a process flow diagram 1000 is shown. The flow diagram 1000 illustrates an embodiment of the process (e.g., routine, function, technique, steps, method, blocks, operation, procedure, etc.) 1000 that may be implemented in connection with the apparatus 100 to determine and regenerate (e.g., produce, provide, and the like) vehicle 50 operational conditions that simulate field (e.g., real world, typical environment, etc.) testing conditions in connection with the dynamometer system 100.

The method 1000 is generally conducted (e.g., performed execute, carried out, etc.) via the apparatus 100 and related electrical apparatuses to emulate measured and recorded field data in a laboratory and/or an environmental control chamber that uses the variable load resistance settings to conduct temperature and environmental cycle testing.

The process 1000 comprises three phases (i.e., stages, sections, segments, portions, steps, etc.): a phase 1100, a phase 1200, and a phase 1300, wherein the phases 1100, 1200, and 1300 are generally serially linked (i.e., performed, conducted, executed, etc.) in order of performance. That is, at START-ing the process 1000, the procedure 1000 enters the phase 1100 (i.e., first phase, phase 1); at the completion of the phase 1100, the procedure 1000 transitions to the phase 1200 (i.e., second phase, phase 2); at the completion of the phase 1200, the procedure 1000 transitions to the phase 1300 (i.e., third phase, phase 3); and at the completion of the phase 1300, the procedure 1000 transitions to an END. However, after the phase 1100 and the phase 1200 have been performed, the phase 1300 may be performed on any desired number of test vehicles 50_TEST.

The first phase (e.g., the phase 1100) generally includes measuring field test data under various predetermined conditions on the baseline vehicle 50_BL. The phase 1100 may comprise sub-steps (e.g., sub-steps 1110, 1120 and 1130).

The sub-step 1110 comprises installing sensors and data acquisition equipment on the baseline vehicle 50_BL. The sub-step 1120 comprises performing baseline test runs and acquiring (i.e., measuring) field data from the baseline vehicle 50_BL. The measurements may comprise motor current, voltage, and temperature. The sub-step 1130 comprises generating profile plots of the field data.

The second phase 2 (e.g., the phase 1200) generally includes setting up the dynamometer system 100 for performing measurements on the dynamometer vehicle 50_DYNO. The measurements may comprise motor current, voltage, and temperature similar to the measurements performed during the phase 1100. The phase 1200 may comprise sub-steps (e.g., sub-steps 1210, 1220 and 1230).

The sub-step 1210 comprises installing sensors and data acquisition and/or measurement equipment on the dynamometer vehicle 50_DYNO; and mounting the dynamometer vehicle 50_DYNO in the retention fixture 120. The sub-step 1220 comprises performing test runs on the dynamometer test vehicle 50_DYNO; and during the test runs, adjusting the load electrical resistance such that the measurements acquired are similar to the profiles of the measurements performed during the phase 1100 (i.e., the field data). The sub-step 1230 comprises recording the resistance settings that produced the desired test conditions for implementation (e.g., use, adjusting resistance, etc.) during testing performed on the test vehicle 50_TEST.

The third phase (e.g., the phase 1300) comprises measuring the performance of the test vehicle 50_TEST and recording the desired test data. Generally, the dynamometer testing that is performed on the test vehicle 50_TEST is conducted in a climatic test chamber such that various environmental conditions may be implemented. In particular, the phase 1300 includes (i) mounting the test vehicle 50_TEST on the test fixture 120; and positioning the dynamometer system 100 (including the dynamometer vehicle 50_DYNO and the test vehicle 50_TEST mounted in test position) in the climatic chamber; (ii) for each desired test condition, setting the load resistance at the appropriate setting as determined in phase 1200; and (iii) performing the desired test run and acquiring desired data. When all desired test runs are completed, ENDing the process 1000.

As is apparent from the above detailed description, the present invention may provide an improved system and an improved method for tracked vehicle dynamometer testing.

Various alterations and modifications will become apparent to those skilled in the art without departing from the scope and spirit of this invention and it is understood this invention is limited only by the following claims.

What is claimed is:

1. A system (100) for tracked vehicle dynamometer testing, the system comprising:
   a dynamometer vehicle (50_DYNO) having dynamometer vehicle tracks;
   a test vehicle (50_TEST) having test vehicle tracks, wherein the test vehicle is similar to the dynamometer vehicle; and
   a test fixture (120) comprising a base (122), a front retention bracket (140), and a rear retention bracket (160); wherein,
      the test fixture (120) vertically, mechanically couples the test vehicle (50_TEST) and the dynamometer vehicle (50_DYNO) together via the front retention bracket (140) and the rear retention bracket (160) such that there is direct, adjacent contact of the test vehicle tracks to the dynamometer vehicle tracks, and the test fixture (120) elevates the dynamometer vehicle (50_DYNO) above the base (122) such that the dynamometer vehicle tracks move freely during the dynamometer testing.

2. The system of claim 1, wherein the system comprises an electromagnetic absorption dynamometer, and the dynamometer vehicle (50_DYNO) comprises an electric motor that is configured as a generator, wherein during the dynamometer testing the electric motor (i) provides a load to the test vehicle (50_TEST) via an electrically coupled adjustable electrical resistance and (ii) an assist to the test vehicle (50_TEST) via an applied voltage.

3. The system of claim 2, wherein the resistance is determined via field testing a baseline vehicle (50_BL) that is similar to the test vehicle.

4. The system of claim 3, wherein the tracked vehicle dynamometer testing is conducted in a climatic chamber to simulate environment of the field testing.

5. The system of claim 3, wherein the tracked vehicle dynamometer testing is conducted in a climatic chamber to simulate environment different from the field testing.

6. The system of claim 1, wherein the test fixture further comprises left and right platform support beams that are fixed to the base, and the front retention bracket and the rear retention bracket are rotatably coupled to the platform support beams to pivot against the test vehicle (50_TEST) and the dynamometer vehicle (50_DYNO) and are locked in place such that test vehicle (50_TEST) and the dynamometer vehicle (50_DYNO) are retained.

7. The system of claim 6, wherein the test fixture further comprises straps that are coupled between the front retention bracket and the rear retention bracket such that the test vehicle (50_TEST) and the dynamometer vehicle (50_DYNO) are retained.

8. The system of claim 6, wherein the front retention bracket and the rear retention bracket further comprise notches that are positioned, sized, and shaped to interface with the test vehicle (50_TEST) and the dynamometer vehicle (50_DYNO) while providing clearance for system payloads.

9. A method for tracked vehicle dynamometer testing, the method comprising:
conducting baseline testing on a baseline vehicle (50_BL) and measuring at least one vehicle parameter;
mounting a dynamometer vehicle (50_DYNO) having dynamometer vehicle tracks and a test vehicle (50_TEST) having test vehicle tracks to a test fixture (120), wherein the test vehicle and the dynamometer vehicle are similar to the baseline vehicle, the test fixture comprises a base (122), a front retention bracket (140), and a rear retention bracket (160), and wherein, the test fixture (120) vertically, mechanically couples the test vehicle (50_TEST) and the dynamometer vehicle (50_DYNO) together via the front retention bracket (140) and the rear retention bracket (160) such that there is direct, adjacent contact of the test vehicle tracks to the dynamometer vehicle tracks, and the test fixture (120) elevates the dynamometer vehicle (50_DYNO) above the base (122) such that the dynamometer vehicle tracks move freely during the dynamometer testing; and
conducting the dynamometer testing on the test vehicle while duplicating the vehicle parameter using the dynamometer vehicle.

10. The method of claim 9, wherein the dynamometer vehicle comprises an electromagnetic absorption dynamometer, and the dynamometer vehicle (50_DYNO) comprises an electric motor that is configured as a generator, wherein during the dynamometer testing the electric motor (i) provides a load to the test vehicle (50_TEST) via an electrically coupled adjustable electrical resistance and (ii) an assist to the test vehicle (50_TEST) via an applied voltage.

11. The method of claim 10, wherein the resistance is determined via matching the vehicle parameter on the dynamometer vehicle.

12. The method of claim 9, wherein the tracked vehicle dynamometer testing is conducted in a climatic chamber to simulate environment of the baseline testing.

13. The method of claim 9, wherein the tracked vehicle dynamometer testing is conducted in a climatic chamber to simulate environment different from the baseline testing.

14. The method of claim 9, wherein the test fixture further comprises left and right platform support beams that are fixed to the base, and the front retention bracket and the rear retention bracket are rotatably coupled to the platform support beams to pivot against the test vehicle (50_TEST) and the dynamometer vehicle (50_DYNO) and are locked in place such that test vehicle (50_TEST) and the dynamometer vehicle (50_DYNO) are retained.

15. The method of claim 14, wherein the test fixture further comprises straps that are coupled between the front retention bracket and the rear retention bracket such that the test vehicle (50_TEST) and the dynamometer vehicle (50_DYNO) are retained.

16. The method of claim 14, wherein the front retention bracket and the rear retention bracket further comprise notches that are positioned, sized, and shaped to interface with the test vehicle (50_TEST) and the dynamometer vehicle (50_DYNO) while providing clearance for system payloads.

17. A test fixture (120) for use in tracked vehicle dynamometer testing, the fixture comprising:
a base (122);
a front retention bracket (140); and
a rear retention bracket (160); wherein,
the fixture is configured to retain a dynamometer vehicle (50_DYNO) having dynamometer vehicle tracks; and
a test vehicle (50_TEST) having test vehicle tracks, wherein the test vehicle is similar to the dynamometer vehicle; and
the test fixture (120) vertically, mechanically couples the test vehicle (50_TEST) and the dynamometer vehicle (50_DYNO) together via the front retention bracket (140) and the rear retention bracket (160) such that there is direct, adjacent contact of the test vehicle tracks to the dynamometer vehicle tracks, and the test fixture (120) elevates the dynamometer vehicle (50_DYNO) above the base (122) such that the dynamometer vehicle tracks move freely during the dynamometer testing.

18. The fixture of claim 17, wherein the fixture further comprises left and right platform support beams that are fixed to the base, and the front retention bracket and the rear retention bracket are rotatably coupled to the platform support beams to pivot against the test vehicle (50_TEST) and the dynamometer vehicle (50_DYNO) and are locked in place such that test vehicle (50_TEST) and the dynamometer vehicle (50_DYNO) are retained.

19. The fixture of claim 18, wherein the fixture further comprises straps that are coupled between the front retention bracket and the rear retention bracket such that the test vehicle (50_TEST) and the dynamometer vehicle (50_DYNO) are retained.

20. The fixture of claim 19, wherein the front retention bracket and the rear retention bracket further comprise notches that are positioned, sized, and shaped to interface with the test vehicle (50_TEST) and the dynamometer vehicle (50_DYNO) while providing clearance for system payloads.

* * * * *